Feb. 20, 1951    F. E. MERRION    2,542,552
COLLET CHUCK
Filed June 10, 1947
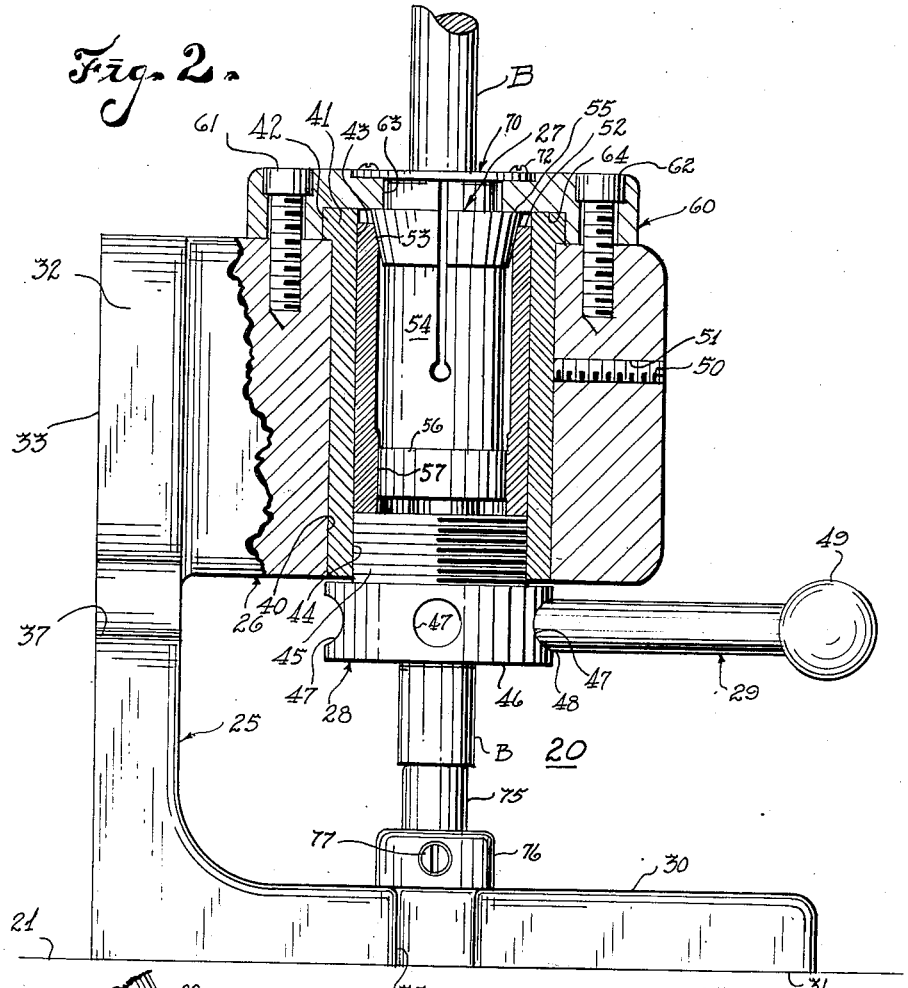
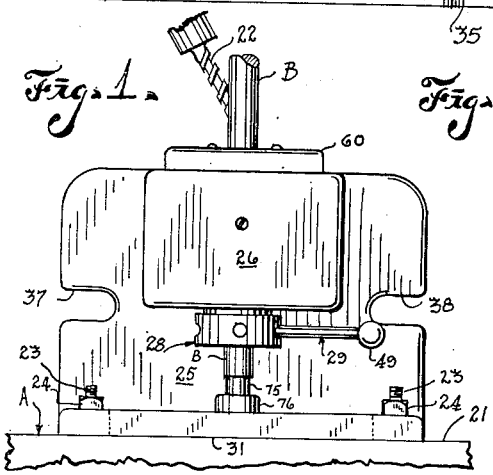
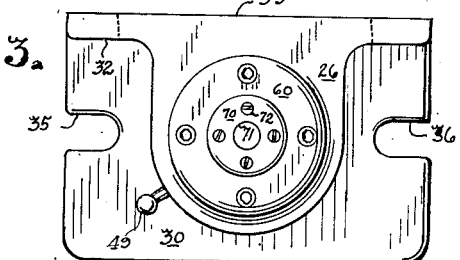
INVENTOR:
Frank E. Merrion,
BY Joseph M. Gartner,
ATTORNEY.

Patented Feb. 20, 1951

2,542,552

UNITED STATES PATENT OFFICE 2,542,552

COLLET CHUCK

Frank E. Merrion, Berwyn, Ill.

Application June 10, 1947, Serial No. 753,657

2 Claims. (Cl. 279—53)

The present invention relates to a tool or work holder of the type known in the art as a collet chuck.

The collet chuck of the present invention, although primarily designed and constructed for use in a conventional drill press, it may also be employed advantageously in a milling machine or other machine tool.

An object and accomplishment of the invention is to provide a collet chuck that will selectively hold any one of a number of replaceable collets of various sizes, the particular selected collet being adaptable to firmly grip any type of small article the size of which substantially corresponds to the size of the particular collet employed. It has been found particularly advantageous and desirable to be able to firmly grip a small article, which article may either be worked upon or, in some instances, may be a tool that is to be employed in working upon other objects, thus permitting freedom of both hands of the operator. Moreover, it is desirable to be able quickly to insert the article in the collet and cause the collet to firmly grip the article, and further, at the same time, it is extremely desirable to be able to have adjustability of the collet chuck to permit the positioning of the collet jaws of the device in selected positions convenient for efficient working upon material secured therebetween.

Accordingly, another object and accomplishment of the invention is to provide a collet chuck which permits the work or tool to be conveniently inserted for operation into the chuck or their removal therefrom without necessitating stopping or changing of settings of the machine tool to which the chuck is adjunctively applied in order to accomplish this.

The invention seeks, as a further object and accomplishment, the provision of a collet chuck of construction such that the work or tool may be held therein to make possible precision drilling, turning, reaming and the like machine tool operations on a production scale without detracting from the precision required in the production of the work.

The present invention further contemplates the provision of a collet chuck of simple and compact construction and which is provided with adjusting devices that are conveniently accessible and easily operable.

A further object and accomplishment of the invention is to improve the construction of collet chucks as herein contemplated with respect to efficiency of operation; and to this end, an important feature of the invention is to provide a clamp in the form of a collet held between an axially movable actuating collet sleeve having a seat which may be secured in various positions of axial adjustment so that the desired clamping movement may be imparted to the collet jaws by movement of an actuating lever to a predetermined position.

The present invention still further contemplates the provision of a collet chuck with which drill presses to which it is applied may be employed not only for turning, drilling and the like operations but also to advantageously duplicate the type of work heretofore turned out on automatic machines.

The invention seeks, as a further object and accomplishment, to provide a collet chuck as contemplated herein and characterized by an arrangement of parts to more advantageously and satisfactorily perform the function required of it and adapted to provide a compact unit which will successfully combine the factors of structural simplicity and durability, and yet be economical to manufacture.

Additional objects, features and advantages of the invention disclosed herein will be apparent to persons skilled in the art after the construction and operation are understood from the within description.

It is preferred to accomplish the various objects of this invention and to practice the same in substantially the manner hereinafter fully described and, as more particularly pointed out in the appended claims, reference being had to the accompanying drawing, which forms a part of this specification, wherein:

Fig. 1 is a front elevational view of a collet chuck as contemplated herein and embodying the features of this invention;

Fig. 2 is a side elevational view of the collet chuck depicted in Fig. 1 and having portions thereof shown in section to more clearly illustrate the construction thereof; and Fig. 3 is a top plan view of the collet chuck depicted in Fig. 1.

The drawing is to be understood as being more or less of a schematic character for the purpose of illustrating and disclosing a typical or preferred form of the improvements contemplated herein and in the drawing like reference characters identify the same parts in the several views.

Referring to the drawing, particularly Fig. 1, I have illustrated the collet chuck with which the present invention is particularly concerned, and designated in its entirety by the numeral 20, as being adjunctively employed, for example, to a drill press designated in its entirety by the letter A and comprising a conventional platen 21 and a conventional tool such as, for example, an indexing drill 22.

In Fig. 1, for example, the collet chuck advantageously may be removably fixed in operative position to the platen 21 by securing means such as, for example, bolts 23 and their associated nuts 24. A work piece or tool designated in its entirety by the letter B illustrated in working position in the collet chuck.

Suffice it to say, since the invention is not particularly concerned with the precise construction of the illustrated drill press or its associated parts, it will not be further described in detail, and it is deemed sufficient for all intents and purposes herein contained to show only portions thereof adjacent to and cooperating with said collet chuck. It is to be understood that details of construction of such drill presses and their associated parts may be modified to suit particular conditions, and may, in some instances, be other types of machinery such as, for example, milling machines or other machine tools, etc., and I do not wish to be limited to the construction of these elements as set forth.

Having thus described by way of example, one possible adaptation of the collet chuck as contemplated herein and having described the general environment surrounding said one adaptation, the specific construction and cooperating functions of the parts of said collet chuck with which the present invention is particularly concerned, will now be described in detail.

In the exemplary embodiment of the invention depicted in Figs. 1 and 2, the collet chuck 20, in general comprises, a base mounting 25 adaptable for quick and convenient securement to, for example, a platen 21 of a drill press or the like, said base mounting having integrally formed therewith a body portion 26 having disposed therein a collet arrangement designated in its entirety by the numeral 27 and including collet clamping means 28 having a collet actuating lever such as at 29 operatively associated with said collet, whereby the collet actuating lever may be manually rotated by the user in a horizontal plane to advantageously clamp and hold relatively small devices being worked upon such as, for example, the rod as at B, tools and the like (not shown) and, in some instances, may be a tool (not shown) that is to be employed in working upon other objects.

The base mounting 25, by any approved practice, may be formed to define a substantially L-shape (Fig. 2) with an arm 30 having a platen engaging surface 31, and arm 32 substantially at right angles to the arm 30 and having a surface 33 adaptable to be placed on a platen when it is desired that the work piece B be in a substantially horizontal position as distinguished from the substantially vertical position as shown. The arms 30 and 32 are provided with recesses 35, 36, and 37, 38, respectively, adaptable to advantageously receive the bolts 23, whereby the device may be removably fixed in a selected operative position convenient for efficient working upon the material secured in the collet. Thus, the device may be selectively secured in operative position so that the work piece B may be in a substantially vertical or substantially horizontal position. Other angular adjustments may be advantageously accomplished by the conventional angular adjustments of the platen and indexing spindles, etc.

In combination with the aforementioned features of the collet chuck 20 as contemplated herein, I have provided the body portion 26 as defining a substantially rectangular shape of pleasing design and having a plain through opening 40 adaptable to receive a collet sleeve 41 having at its upper portions, a flange 42 adaptable to engage adjacent portions of the body portion, thereby to facilitate the prevention of further downward movement of the collet sleeve after the insertion thereof in operative position, in the opening 40. The sleeve is provided with a central through opening 43 having adjacent its lower end suitable threads 44 adaptable to receive complementary threads 45 of the collet actuator member 28 which comprises a substantially circular-shaped member 46 having a plurality of apertures 47 adaptable to selectively receive end portions 48 of the lever 29 which, for convenience of grip, is provided with a knob as at 49.

In order to prevent axial rotation of the collet sleeve 41, I have provided set screw 50 adaptable to be received into a suitably threaded aperture 51 for engagement with the collet sleeve 41, thereby to hold same in a fixed position.

Operatively disposed within the central through opening 43 of the sleeve 41 for axial sliding movement therein, I have provided an inner collet sleeve 52 having adjacent the upper end thereof, a tapered seat flared outwardly, as indicated at 53 in Fig. 2, and engageable by the outer portion of a collet member 54 housed within the inner collet sleeve 52, said collet member having adjacent its upper portions a flanged tapered portion 55 complementary to and engageable by the seat 53. The collet member 54 adjacent the jaws thereof is longitudinally divided so as to preferably form two or more jaws in conformity with conventional collets. The collet member 54 is further provided with a projecting portion 56 adaptable to slidably engage lower portions 57 of the inner collet sleeve 52, thereby to hold the collet member in position.

In adverting to Fig. 2 it can be observed that the lower portions of the inner collet sleeve 52 are in engagement with the collet actuator member 28, whereby the rotation of said actuator, by means of the lever 29, will cause the actuator to be threaded upwardly into the collet sleeve 41, thereby forcing the inner collet sleeve 52 to move upwardly which will cause the seat 53 to wedgingly engage the flanged portion 55 of the collet member 54 which will cause the jaws thereof to close and grip the article desired to be held therebetween.

It is important to note that upward movement of the collet member 54 must be restricted; therefore, I have provided a cover cap 60 removably secured to the body portion 26 by securing means such as, for example, screws 61 and 62 (Fig. 2), said cover cap having a central through aperture 63 and an inner recess 64 having portions therein in engagement with said collet sleeve member 41, thereby to hold such members in operative position.

In addition to the aforementioned features of the subject collet chuck, an important feature contemplated herein is the provision of a cover plate 70, whose primary function is to prevent shavings and fine pieces of metal from entering the collet which would cause jamming. To accomplish this, I have provided the cover plate with a central aperture 71 of a size slightly larger than the work piece or tool B. The cover plate is removably secured to the cover cap 60 by securing means such as, for example, screws 72.

It is important to understand that the collet sleeve member 41 is designed to receive any one of a number of different inner collet sleeves and collets, the jaws of which differ in size from each other, the particular size to be selected is to be determined by the characteristics of the work piece or tool to be held. Thus, by removing the collet actuator 28, the inner collet sleeve 55 and the collet member 54 as shown may be removed from the device through the bottom of the body portion and may be replaced by another such sleeve and collet member (not shown), but of different size without necessitating the removal of the cover cap 60. This feature increases the versatility of the device for employment in many different operations.

In order to facilitate employment of the collet chuck for production methods, I have provided the adjustable stop pin 75 which may be raised or lowered by virtue of the collar 76 and set screw 77, thereby permitting a setting to be made and the operator need only to insert the work piece in the device into engagement with the stop pin 75, as shown in Fig. 2, and the work piece will be in proper position for convenient and efficient work thereon.

Summarily, the operation of the collet chuck contemplated herein may be as follows: If it is desired, for example, to employ the collet chuck adjunctively to a conventional drill press, the collet chuck may be advantageously and selectively positioned on the platen as at 21 in either the vertical position as shown in Fig. 2 or a horizontal position (not shown) whereby the surface 33 will become the platen engaging surface, thereby the material B secured in the device will be in a horizontal position. Moreover, further angular adjustments of the collet chuck may be advantageously accomplished by the conventional angular adjustments of the platen and/or the indexing drill member of the drill press.

After the desired position is determined the collet chuck is removably but fixedly secured to the platen by means of conventional bolts 23 and their associated nuts 24. Thus, it can be observed that the collet chuck is now in position to receive a work piece such as, for example, the rod B which may be conveniently and quickly inserted into the device through the aperture 71, and placed in position so that the lowermost portions of the rod B engage the stop pin 75. It can be observed that the lower portions of the inner collet sleeve 52 are in engagement with the collet actuator member 28, whereby upon manual rotation of said actuator by means of the lever 29, the actuator 28, by virtue of the complementary threaded formations 44 and 45 which cause the actuator to be threaded upwardly into the collet sleeve 41, will force the inner collet sleeve 52 to move upwardly which will cause the seat 53 to wedgingly engage the flanged portion 55 of the collet member 54 which will cause the jaws thereof to close and grip the article B desired to be held therebetween. It is notable that only approximately a quarter turn of the lever 29 will be sufficient to securely grip the rod B. Moreover, it can be observed that the lever 29 may be removed from the collet actuator member 28 and placed in any one of a plurality of apertures such as 47, the aperture selected being the most convenient with respect to location. It is notable that the collet chuck contemplated herein will selectively hold any one of a number of replaceable collets of various sizes. The particular selected collet being adaptable to firmly grip any type of small article, the size of which substantially correspond to the size of the particular collet employed. Thus, by removing the collet actuator 28, the inner collet sleeve 55 and the collet member 54 as shown may be removed from the device through the bottom of the body portion and may be replaced by another such sleeve and collet member (not shown), but of different size without necessitating the removal of the cover cap 60. This feature increases the versatility of the device for employment in many different operations.

Thus, it may be observed that a collet chuck constructed according to my invention permits the rapid production of precision work while using only relatively unskilled labor.

Moreover, from the foregoing disclosure it can be observed that I have provided a collet chuck which efficiently fulfills the objects thereof as hereinbefore set forth and provides numerous advantages which may be summarized as follows:

1. Structurally simple, efficient and durable;
2. Economical to manufacture and readily adaptable to mass production manufacture; and
3. The provision of a collet chuck employing the highly desirable principles of being able to quickly insert an article in the collet and cause the collet to firmly grip the article, and further, at the same time provide ability of the collet chuck and the collet jaws to be placed in selected positions convenient for facilitating the efficient working upon the material secured therebetween.

While I have illustrated a preferred embodiment of my invention, many modifications may be made without departing from the spirit of the invention and I do not wish to be limited to the precise details of construction set forth, but wish to avail myself of all changes within the scope of the appended claims.

Having thus described my invention, what I claim as new and desire to secure by Letters Patent of the United States, is:

1. In a chuck, the combination comprising a base mounting member formed to define an L-shape and adaptable for selective placement on a support on one or the other of the outside surfaces of the L defining the back and bottom of the mounting member, said mounting member having a body portion, a first sleeve member disposed within said body member, a second sleeve member slidable within said first sleeve member, a collet operatively disposed within said second sleeve member and having clamping jaws, means associated with said second sleeve member and said collet for actuating said jaws, means comprising a stop member to facilitate the positioning of articles inserted in said collet, and means including a cover plate adaptable to prevent foreign matter from entering said collet.

2. In a chuck having a base mounting member having integrally formed therewith a body portion, a collet arrangement operatively disposed within said body member and comprising a first sleeve member, a second sleeve member slidable within said first sleeve member, a collet operatively disposed within said second sleeve member and having clamping jaws, means associated with said second sleeve member and said collet for actuating said jaws, and means for sliding said second sleeve member including a collet actuator means operatively associated with said first sleeve member and in engagement with said second sleeve member, in combination with means to facilitate removal and replacement of collets of various sizes, means comprising a stop member to facilitate the positioning of articles inserted in said collet chuck, and means including a cover plate adaptable to prevent foreign matter from entering said collet.

FRANK E. MERRION.

REFERENCES CITED

The following references are of record in the file of this patent:

UNITED STATES PATENTS

| Number | Name | Date |
|---|---|---|
| 2,338,060 | Redmer | Dec. 28, 1943 |
| 2,429,617 | Gustafson | Oct. 28, 1947 |
| 2,431,594 | Wernig | Nov. 25, 1947 |
| 2,434,600 | Swenson | Jan. 13, 1948 |

FOREIGN PATENTS

| Number | Country | Date |
|---|---|---|
| 558,412 | Great Britain | Jan. 4, 1944 |